(12) United States Patent
Soucy et al.

(10) Patent No.: US 7,272,558 B1
(45) Date of Patent: Sep. 18, 2007

(54) SPEECH RECOGNITION TRAINING METHOD FOR AUDIO AND VIDEO FILE INDEXING ON A SEARCH ENGINE

(75) Inventors: Pascal Soucy, Quebec (CA); Laurent Simoneau, St. Augustin De (CA); Richard Tessier, Levis (CA)

(73) Assignee: Coveo Solutions Inc., Québec (CA)

( * ) Notice: Subject to any disclaimer, the term of this patent is extended or adjusted under 35 U.S.C. 154(b) by 0 days.

(21) Appl. No.: 11/690,235

(22) Filed: Mar. 23, 2007

Related U.S. Application Data (60) Provisional application No. 60/868,222, filed on Dec. 1, 2006.

(51) Int. Cl.
*G10L 15/06* (2006.01)
*G10L 15/26* (2006.01)
*G06F 17/30* (2006.01)

(52) U.S. Cl. ............... 704/235; 704/243; 704/255; 707/2

(58) Field of Classification Search ........... 704/231, 704/235, 243, 244, 251, 255; 707/2, 3
See application file for complete search history.

(56) References Cited

U.S. PATENT DOCUMENTS

| 5,696,962 A | * | 12/1997 | Kupiec ............... 707/4 |
| 5,799,273 A | | 8/1998 | Mitchell et al. |
| 6,345,253 B1 | * | 2/2002 | Viswanathan ............ 704/272 |
| 6,418,431 B1 | | 7/2002 | Mahajan et al. |
| 6,430,551 B1 | | 8/2002 | Thelen et al. |
| 6,490,558 B1 | | 12/2002 | Kahn et al. |
| 6,603,921 B1 | * | 8/2003 | Kanevsky et al. ......... 386/96 |
| 6,816,858 B1 | | 11/2004 | Coden et al. |
| 6,925,436 B1 | | 8/2005 | Franz et al. |
| 6,941,264 B2 | | 9/2005 | Konopka et al. |
| H2189 H | * | 5/2007 | Rao et al. ............ 704/270.1 |
| 7,240,069 B2 | * | 7/2007 | Samsonov ............. 707/102 |
| 2004/0176946 A1 | | 9/2004 | Billa et al. |
| 2006/0212296 A1 | | 9/2006 | Espy-Wilson et al. |

FOREIGN PATENT DOCUMENTS

EP 1630705 3/2006

OTHER PUBLICATIONS

Salgado-Garza et al., Spoken information retrieval for multimedia databases, Computer Science Department ITESM Campus Monterrey, Monterrey, N.L., C.P. 64849, Mexico, IEEE, 2005.
Leavitt, N. Let's hear it for audio mining, Computer, Oct. 2002, vol. 35, Issue 10, pp. 23-25.
http://www.lumenvox.com/products/speech_tuner/, Speech Tuner for Speech Engine, LumenVox.com, Jan. 2007.

(Continued)

*Primary Examiner*—Martin Lerner
(74) *Attorney, Agent, or Firm*—Ogilvy Renault, LLP (57) ABSTRACT

A method and a related system to index audio and video documents and to automatically train the language model of a speech recognition system according to the context of the documents being indexed.

16 Claims, 9 Drawing Sheets

OTHER PUBLICATIONS http://www.nuance.com/audiomining/sdk/, Dragon AudioMining SDK for Dragon AudioMining, Jan. 2007.
http:/wwcslu.cse.ogi.edu/HLTsurvey/ch1node4.html, Zue et al., Speech Recognition, Jan. 2007.

Salgado-Garza et al., On the Use of Automatic Speech Recognition for Spoken Information Retrieval from Video Databases, Computer Science Department, ITESM, Campus Monterrey, Monterrey, N.L., Mexico, C.P. 64849, CIARP 2004, LNCS 3287, pp. 381-385, 2004.

* cited by examiner

Keyphrases

| Keyphrase | Frequency |
|---|---|
| image library | 4 |
| cookie | 3 |
| list extensions | 3 |
| messaging | 2 |
| management | 2 |
| programmers | 2 |
| platform | 1 |
| ... | |

800

Proper Nouns (Persons, locations, organizations, product names, etc.)

| Proper Noun | Frequency |
|---|---|
| MSN | 5 |
| Visual Studio 2005 | 3 |
| TechNet | 2 |
| Martin Dowski | 1 |
| Microsoft Outlook | 1 |
| OPML | 1 |
| Simple Sharing Extensions | 1 |
| ... | |

Keyphrases

| Keyphrase | Frequency |
|---|---|
| image library | 5 |
| cookie | 3 |
| list extensions | 3 |
| messaging | 2 |
| management | 2 |
| programmers | 2 |
| platform | 1 |
| information | 1 |
| biopolymer structures | 1 |
| Analysis | 1 |

Proper Nouns (Persons, locations, organizations, product names, etc.)

| Proper Noun | Frequency |
|---|---|
| MSN | 5 |
| Visual Studio 2005 | 3 |
| TechNet | 2 |
| Martin Dowski | 1 |
| Microsoft Outlook | 1 |
| OPML | 1 |
| Simple Sharing Extensions | 1 |
| Jena Library | 1 |
| Biological Macromolecules | 1 |

SPEECH RECOGNITION TRAINING METHOD FOR AUDIO AND VIDEO FILE INDEXING ON A SEARCH ENGINE

CROSS-REFERENCE TO RELATED APPLICATIONS

This application claims priority under 35 U.S. §119(e) of U.S. provisional patent application 60/868,222, filed on Dec. 1st, 2006, the specification of which is hereby incorporated by reference.

TECHNICAL FIELD

The present description relates to the field of information retrieval, and more particularly, to search engines such as those found on an intranet or in a corporate network. The application is also related to speech recognition systems.

BACKGROUND

A search engine is a system that retrieves information from a database. Here, a database can be any type of repository containing electronic documents, for instance: the Web, mailing archives, file repositories, etc. Documents can contain text, images, audio and video data. Most search engines only index the textual part of documents.

A speech recognition engine automatically converts spoken words from an audio stream into computer text. The result of the operation is named a "transcription". There are two-types of speech recognition systems: those that are speaker-dependent (trained and optimized to capture the speech of a specific speaker) and those that are speaker-independent (needing no training for a specific speaker).

Speech recognition engines generally use language models. Language models are probabilistic distributions on sequences of words. These models capture the probability of the next word in a sequence. Both speaker-dependent and speaker-independent systems may have language models. Some speech recognition software can have their language model trained using training text. These systems modify their pre-determined language model with new probabilities estimated from the additional training text supplied by the user of the software. For instance, a system can be packaged with a "U.S.-English" language model, which captures the statistics of the generation of English in the general U.S. population.

These systems also use dictionaries that define the set of word candidates. On some systems, the dictionary can also be modified by the user of the speech recognition system.

The modification of the dictionary and the training of the language model allow a user to specifically optimize the speech recognition engine for a specific domain. For instance, a call center using a speech recognition system to archive and analyze customer requests may want to optimize the language model to reflect the greater use of terms related to its product line in order to optimize the accuracy of the transcription.

SUMMARY

The present application describes a method and a related system to index audio and video documents and to automatically train the language model of a speech recognition system according to the context of the documents being indexed.

According to an embodiment, there is provided a method for indexing audio/video documents through the use of a search engine. The method comprising: providing, to the search engine, a source of training documents comprising textual content; the search engine retrieving at least some of the training documents from the source of training documents; the search engine extracting the textual content from the retrieved training documents; the search engine indexing the textual content; training a speech recognition profile using the indexed textual content; providing, to the search engine, a source for the audio/video documents each of which comprise an associated audio content; the search engine retrieving at least some of the audio/video documents from the source of documents; the search engine extracting the associated audio content from the audio/video documents; converting the associated audio content into transcriptions using the trained speech recognition profile; the search engine indexing the transcriptions thereby resulting in an indexing of the audio/video documents; and saving the indexed transcriptions.

According to an embodiment, there is provided a method of audio video documents. The method comprising: querying a database with a given search criterion, the database comprising transcriptions indexed according to the indexing method described above; and displaying the search results to a user.

According to an embodiment, there is provided a search engine system for indexing audio/video documents. The search engine system comprises a search engine for: receiving a source of training documents comprising textual content; retrieving at least some of the training documents from the source of training documents; extracting the textual content from the retrieved training documents; indexing the textual content; receiving a source for the audio/video documents each of which comprise an associated audio content; retrieving at least some of the audio/video documents from the source of documents; and extracting the associated audio content from the audio/video documents. The search engine system further comprises a training engine for training a speech recognition profile using the indexed textual content; and a speech recognition engine converting the associated audio content into transcriptions using the trained speech recognition profile. The search engine is further for indexing the transcriptions thereby resulting in an indexing of the audio/video documents. Finally, the search engine system comprises an index for saving the indexed transcriptions.

Suppose a technology company ABC that sells wireless devices. On its Web site, many video files explain to potential customers the benefits of using its products. The company wants to install a search engine on its Web site to allow customer to find content, texts and video, on the Web site, by submitting textual queries. A speech recognition engine can be used to convert speech into text and the text can be indexed to match user queries. However, the speech recognition engine is packaged with a general U.S.-English language model. When the engine tries to recognize technical words, it fails since its dictionary does not contain these words. Moreover, the language model does not reflect the probabilistic distribution of other known terms, such as "wifi" and "wireless", which are more frequently used on ABC's web site than in the general U.S. population. One way to improve the speech recognition accuracy, and thus the accuracy of search results, is to ask ABC's knowledge managers to train the speech recognition engine using relevant texts that would capture the enterprise language model. However, most enterprises don't have the expertise to do such training.

This embodiments described herein enable the automatic training of the language model and modifying the dictionary of a speech recognition engine used along with a search engine to index the speech of audio and video content. The result of this training is named a profile. The training is performed by using contextual textual content related to the audio and video documents. Indexing of textual content and transcriptions is performed according to methods known to those skilled in the art.

BRIEF DESCRIPTION OF THE DRAWINGS

Further features and advantages of the present application will become apparent from the following detailed description, taken in combination with the appended drawings, in which.

It will be noted that throughout the appended drawings, like features are identified by like reference numerals.

DETAILED DESCRIPTION

Figure 1:
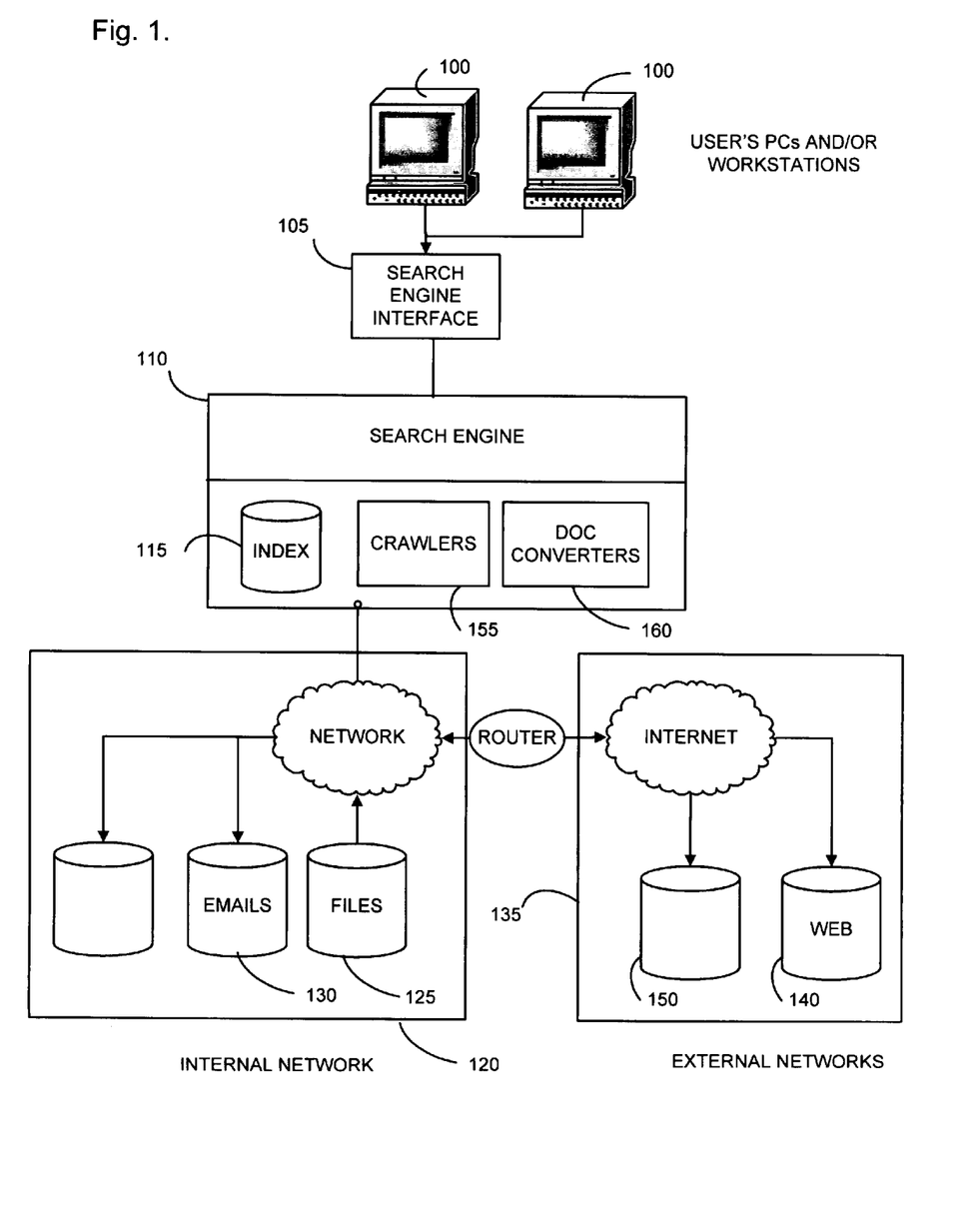
FIG. 1 is a diagram illustrating the typical general architecture of a search engine.

Referring to the figures, FIG. 1 illustrates the functionality of a traditional search engine on a corporate network. A PC or Workstation 100 submits queries to a search engine interface 105. The search engine interface communicates data to the search engine system 110. The search engine takes the query inputted to the interface 105 by a user and consults an index (database) 115 to respond to the query. The index 115 is built by getting documents from many locations, which may comprise an internal network 120, where files 125 and emails 130 are stored, and/or an external network 135, where Web documents 140 are crawled, for instance. Documents from other databases 150 may also be retrieved. Crawlers 155 are processes that scan and retrieve documents on repositories, storage centers, etc. The documents thus retrieved are converted by document converters 160 in order to extract textual content and metadata from the documents.

Figure 2:
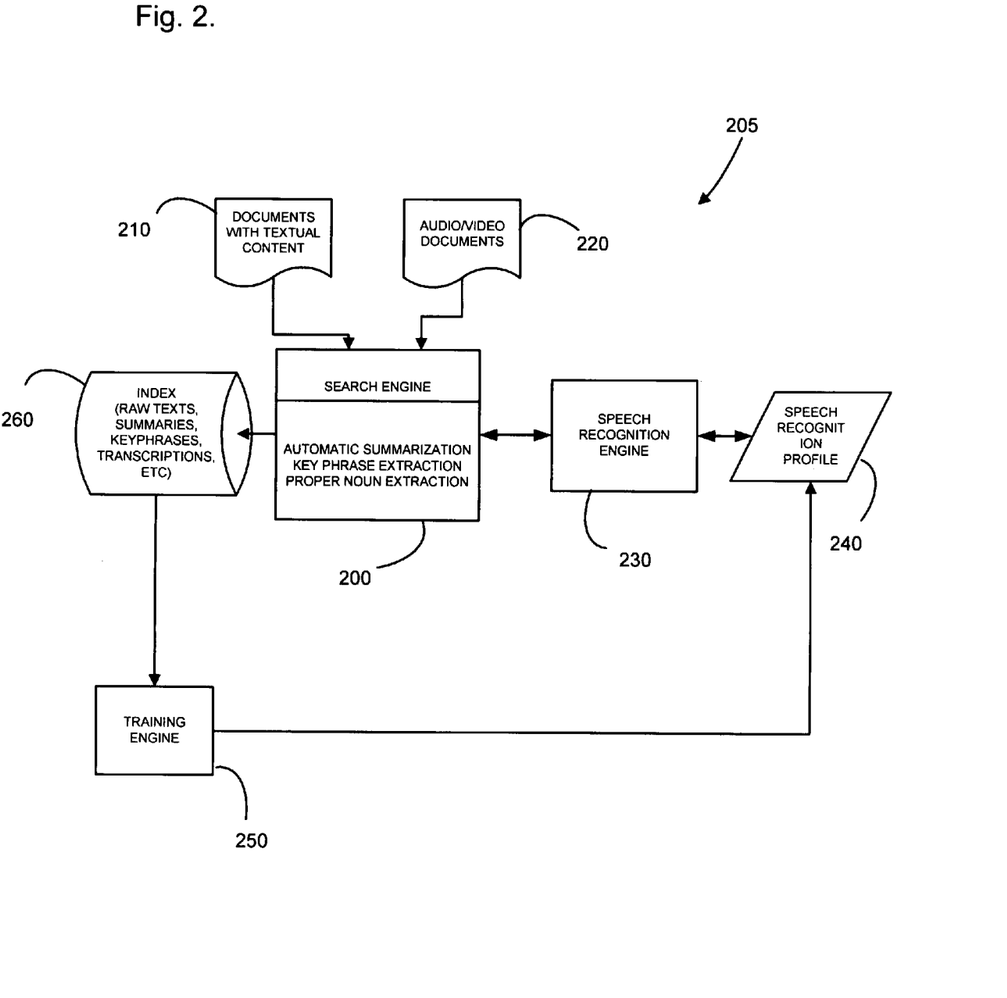
FIG. 2 is a diagram illustrating a search engine system comprising a search engine that uses a speech recognition system to index audio and video content according to an embodiment.

Still referring to the figures, FIG. 2 illustrates the architecture of search engine system 205 comprising a search engine that uses a speech recognition module to index audio and video content by automatically training a profile using training data from textual content contained in an index. A Search Engine 200 indexes document with textual content 210 and documents with audio and video content 220. Note that a document can have both textual and audio content. A speech recognition engine 230 uses a speech recognition profile 240 trained by a training engine 250. The training engine gets data from the index 260, where the search engine 200 saves data. This data may comprise the original textual contents from the documents 210, the indexed textual content, indexed transcriptions (further explained below), automatic summaries of the documents generated by an automatic summary generation module, key phrases and proper nouns automatically extracted from the documents, the document meta-data, etc. While FIG. 2 shows documents with audio and video content 220 being provided to speech recognition engine 230, it is possible to feed the documents with audio and video content 220 to the speech recognition profile 240.

A document summary consists of the most relevant sentences automatically extracted from a text document by a program. Key phrase extraction is a similar process where the most important phrases from a text are extracted. Proper noun extraction is the extraction of person names, locations, organizations, etc., from texts. All these processes use natural language processing tools or statistic tools whose description are known to those skilled in the art. Meta-data is any information about the document content that is available to the search engine, for instance fields such as the author of the document, the title of the document, etc.

Figure 3:
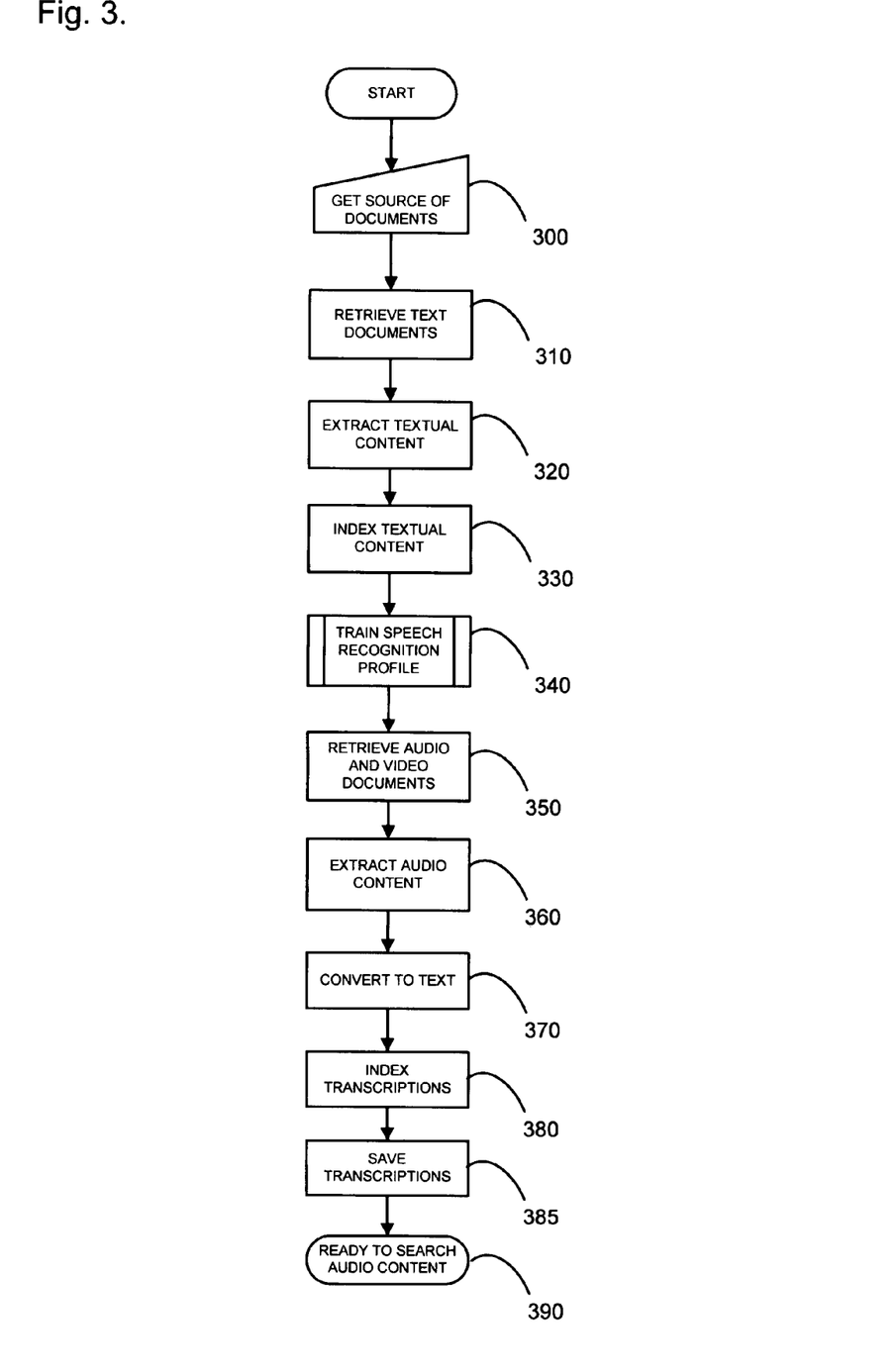
FIG. 3 is a flowchart of the steps performed by the search engine during the indexing of audio and video content according to an embodiment.

In one embodiment and still referring to the figures, FIG. 3 is a flowchart showing the high-level steps performed by the search engine to index and train the speech recognition engine in one embodiment. First at 300, the source of documents to index (containing both textual and audio/video documents) is obtained from the administrator of the search engine. Then, at 310, the search engine retrieves the text documents found in the repository. An example of this process is the crawling and retrieval of Web documents on a web site. At 320, the textual part of documents is extracted and then indexed at 330. This indexed data will constitute the base of the training data. At 340, the training of the speech recognition profile is conducted. This step is described in detail later at FIG. 5. At 350, after completion of the training of the speech recognition profile, the search engine retrieves audio and video documents. Then at 360, the audio portions of these audio and video documents are extracted. The audio portions are converted to text at 370 using a speech recognition module with the trained profile resulting from 340. The resulting text, or transcriptions, are then indexed at 380 and saved (at 385) in an index (or other form of memory or database) and the index is ready to be searched at 390. Changes to the sequence illustrated hereinabove can be readily made without departing from the spirit of this embodiment.

Figure 4:
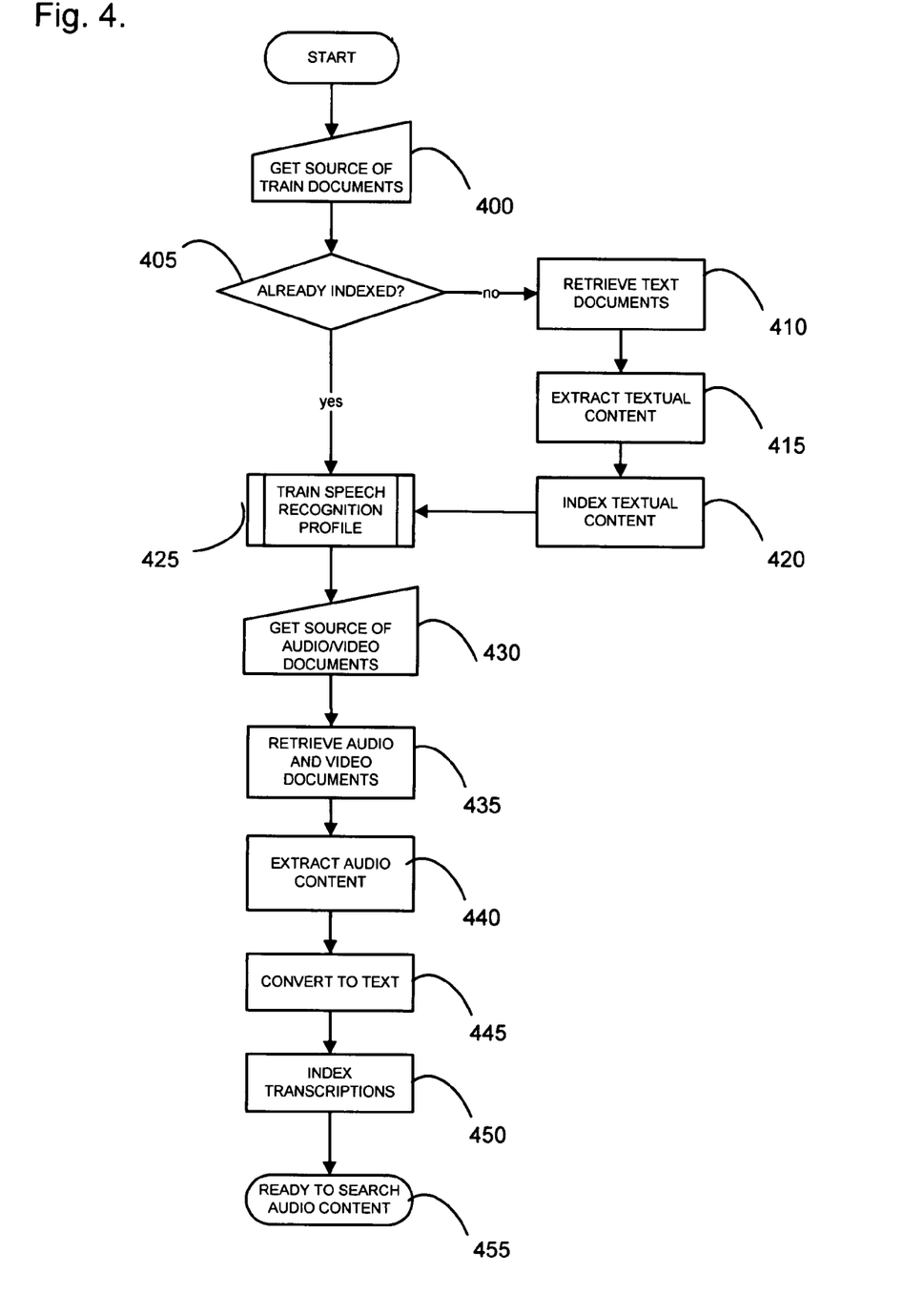
FIG. 4 is a flowchart of the steps performed by the search engine during the indexing of audio and video content according to another embodiment.

Still referring to the figures, FIG. 4 is the flowchart of another embodiment similar to that of FIG. 3. At 400, the system starts by accepting from the search engine administrator a source of training documents. In this embodiment, the training documents need not be from the same repository as the documents containing the audio and video content to index. The source of documents specified at 400 may or may not have been already indexed. At 405, the system verifies if the source has already been indexed. If not, it goes to step 410, where it retrieves the documents, then extracts and indexes them at 415 and 420 to continue at 425. If the source was already indexed at 405, the system branches directly to step 425 where the speech recognition profile is trained, as detailed at FIG. 5. At 430, the system accepts as input a source of documents comprising audio and video content which to be indexed. This source of documents may also contain textual documents that could be indexed or not, according to the system administrator's preferences. At 435, the audio and video documents are retrieved. The audio portions of these documents are extracted at 440 and converted to text at 445 by the speech recognition engine using the profile trained at 425. The transcriptions resulting from this step are indexed by the search engine at 450 and the audio/video content (and text content) is ready to be searched at 455.

Figure 5:
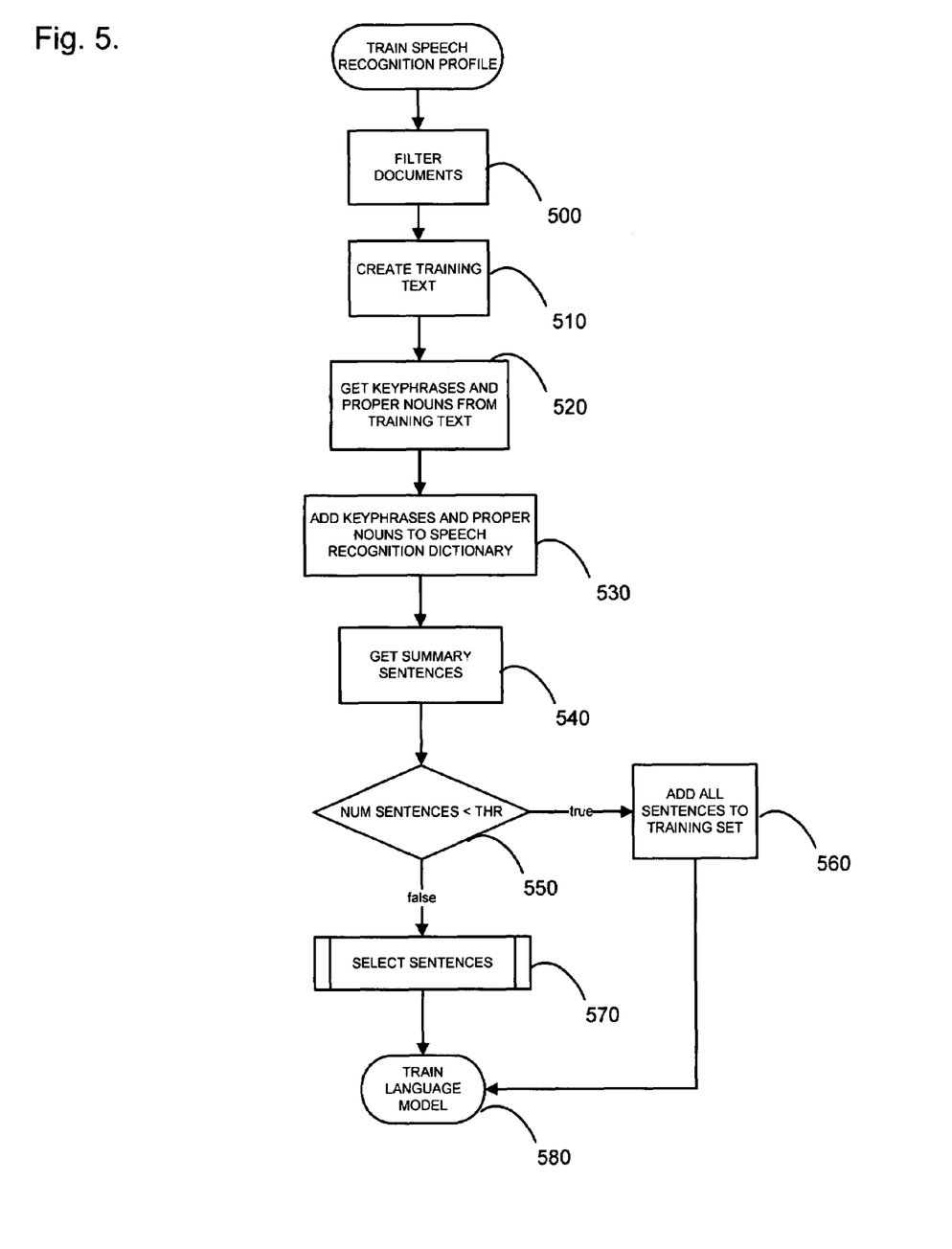
FIG. 5 is a flowchart of the process of training the speech recognition profile according to an embodiment.

Still referring to the figures, FIG. 5 is a flowchart that illustrates the training of the speech recognition profile, which is the process performed in 340 and 425 from FIG. 3 and 4 respectively. This profile has two parts: a dictionary, which is the list of candidate words that the speech recognition engine uses to determine the next word to transcribe in a sequence. The second part of the profile is the language model, which captures the probabilistic distribution of word sequences, which determines the probability of the next word in the sequence. Most speech recognition engines have means for users to train the language model and add words to the dictionary. In this description, we will consider a generic speech recognition engine that offers both, but the use of the system described herein with a speech recognition system that provides only a mean to train either a dictionary or the language model does not invalidate the claims or scope of the description.

First at 500, the system accepts a filter string. This string can contain Boolean operators and determine which documents are kept for the rest of the training process. For instance, the filter "biopolymer" would keep all documents in the index that contain the word "biopolymer" and these documents would be gathered at 510 to generate the training text. Many distinct filters can be used to accept or to reject documents. At 520, key phrases and proper nouns are extracted from the training data using a proper noun and key phrase extractor algorithm. At 530, the key phrases and proper nouns are added to the profile's dictionary. At 540, the summary sentences as extracted by an automatic document summarizer program are gathered. Software and methods to extract summaries, key phrases and proper nouns are known to the person skilled in the art. Changes to the sequence illustrated here can be readily made without departing from the spirit of the description. It is not mandatory to use an automatic document summarizer. If no document summarizer is used, then all the sentences from the texts are used instead and constitute the set of summary sentences. A threshold THR is used at 550. If the total number of sentences from all summaries is smaller than THR, all the summary sentences are kept in the training set at 560 and the language model is trained with this set through the language model training tool provided by the speech recognition software at 580. Otherwise, sentences are selected at 570 in a process detailed in FIG. 6. Also note that any document meta-data may also be extracted in the process to be added to the training text.

Figure 6:
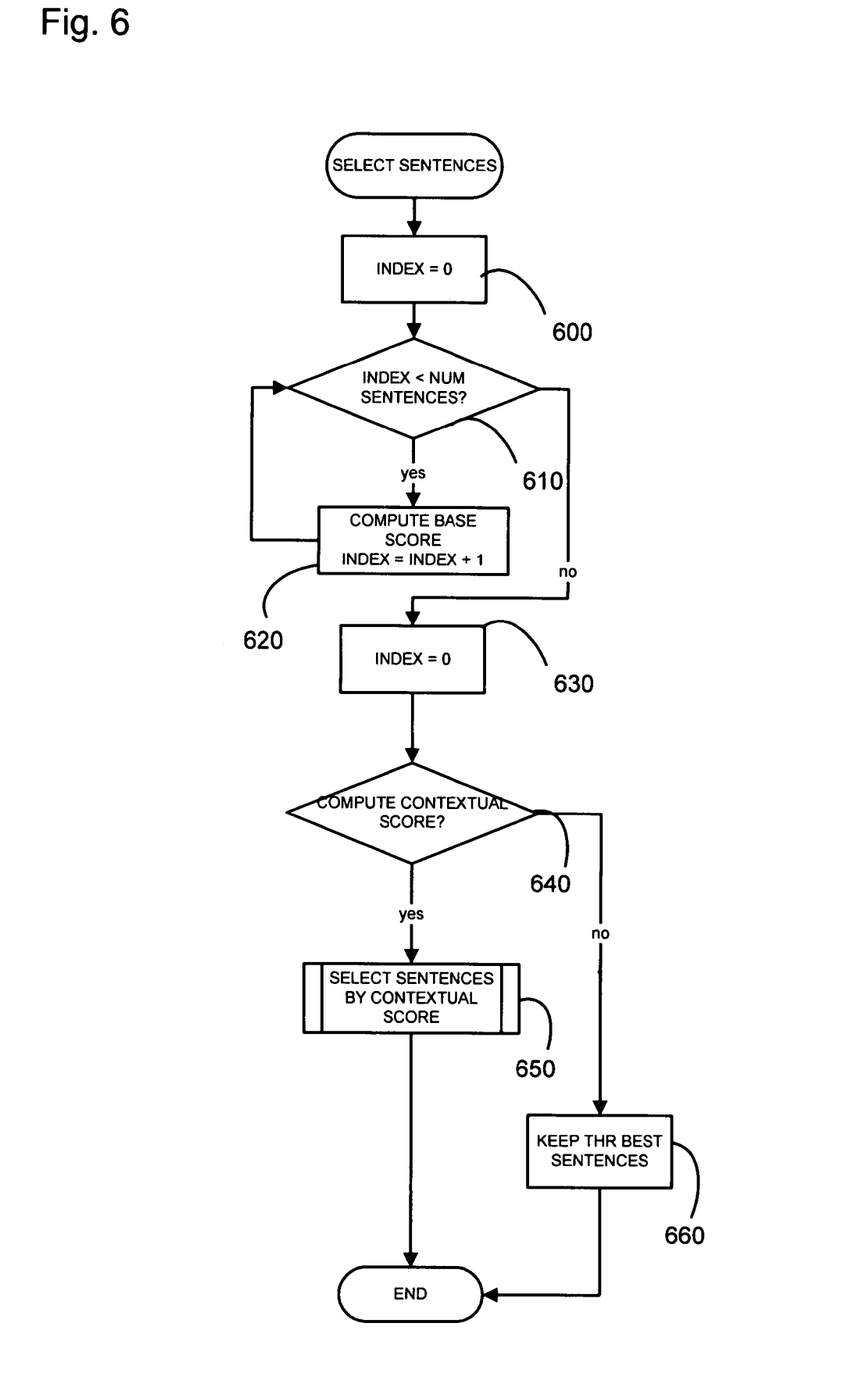
FIG. 6 is a flowchart of the process of selecting sentences (from FIG. 5) used to train the language model.

Still referring to the Figures, FIG. 6 is a flowchart that illustrates the sentence selection process. This process corresponds to 570 from FIG. 5. First, an index is initialized at 600. At 610, the system verifies if there are still sentences to process. At 620, a base score is assigned to the sentence at Index. This score is obtained by the following equation:

BASESCORE=PERFECT_SCORE

−(|length(sentence)−NORMAL_LEN|)~LEN_FAC-TOR

−(|nonalpha(sentence)−NORMAL_NONALPHA|)
·NONALPHA_FACTOR

Where PERFECT_SCORE, LEN_FACTOR, NORMAL_LEN, NORMAL_NONALPHA, NONALPHA_FACTOR are constants, length (sentence) is the number of words in the sentence and nonalpha (sentence) is the number of non alphabetic characters. This equation measures how far from an ideal sentence the sentence to evaluate is. For instance, sentences that are either too short or too long (first part of the equation) and sentences that contains too many non-alphabetic characters get a lower score. If PERFECT_SCORE=100, NORMAL_LEN=20, LEN_FACTOR=0.5, NORMAL_NONALPHA=3, NONALPHA_FACTOR−0.65, and the following sentence:

"At 25° C. under 1 atm of air, a liter of water will dissolve about 6.04 cc (8.63 mg, 0.270 mmol) of oxygen, whereas sea water will dissolve about 4.9 cc (7.0 mg, 0.22 mmol)."

The equation gives:

BASESCORE=100−(|35−20|*0.5)−(|34−3|*0.65)

BASESCORE=72.35

When all sentences have been processed, the process continues at 640. At this step, it is possible (configurable parameter) to either terminates the scoring process and keep the THR best sentences at 660, or to branch at 650 where sentences will be selected according to a contextual score described at FIG. 7.

Figure 7:
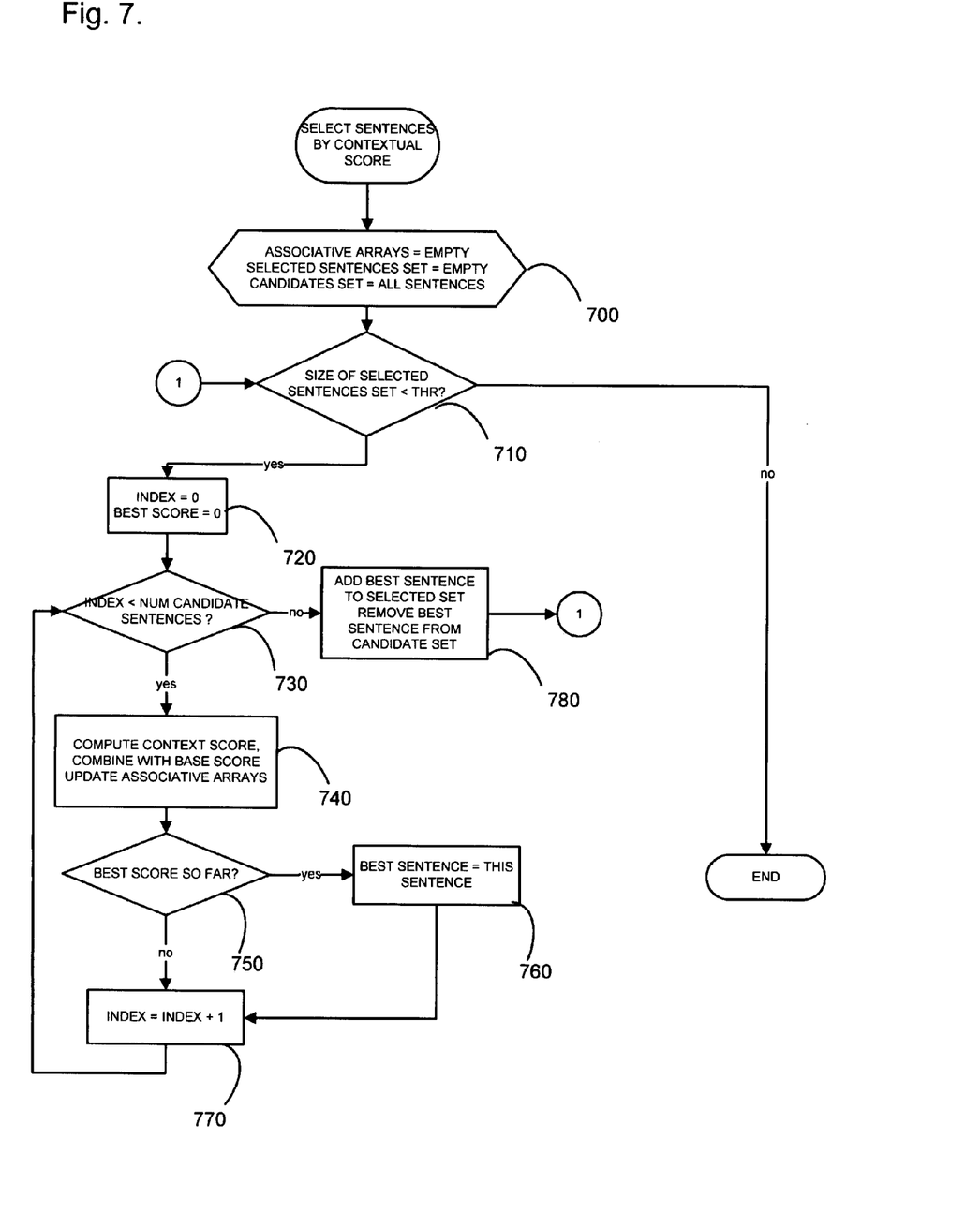
FIG. 7 is a flowchart of the process of selecting sentences (from FIG. 6) by calculating the contextual score.

Still referring to the Figures, FIG. 7 is a flowchart that illustrates the process at 650 from FIG. 6. This process selects sentences based on a contextual score.

Figure 8:
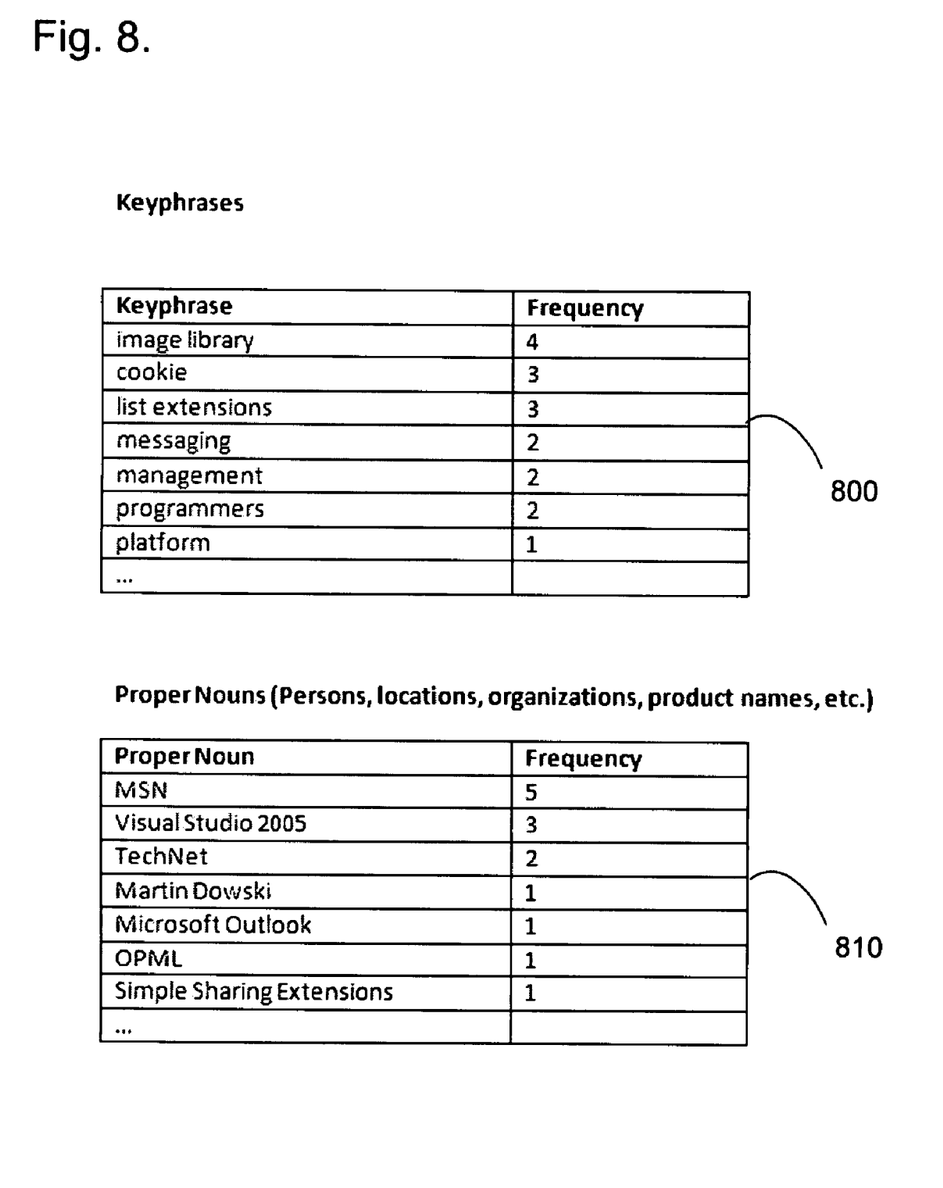
FIG. 8 contains tables to illustrate the use of the associative arrays to calculate the contextual scores.

The process starts at 700, where two associative arrays are initialized with no element inside them. These arrays are illustrated at FIG. 8. A first array will contain key phrases, as illustrated by an example at 800, and another array will contain proper names, as in 810. Also at 700, a set that will contain selected sentences is initialized with no elements in it and another set of candidates is initialized by containing all sentences (all summary sentences if a document summarizer is used in the process, all sentences otherwise). At 710, the algorithm verifies if the size of the selected sentence set is greater that the threshold THR. If it is not the case, it branches at 720, where and Index and the Best Score are initialized. Then, the algorithm verifies if the Index is smaller than the number of sentences in the candidate set at 730, which is always the case at this point. At 740, it first calculates the context score and combines it with the base score calculated in 620. The context score is obtained by the following equation:

$$\text{CONTEXT\_SCORE} = \left( \sum_{keyphrase \in Sentence} \frac{1}{Freq_{array}(\text{keyphrase}) + 1} \right) \text{KEYPHRASE\_CONST} +$$

$$\left( \sum_{propernoun \in Sentence} \frac{1}{Freq_{array}(\text{propernoun}) + 1} \right) \text{PROPERNOUN\_CONST}$$

For instance, given the example in FIG. 7 and the following sentence:

"This image library (Jena Library of Biological Macromolecules) is aimed at a better dissemination of information on three-dimensional biopolymer structures with an emphasis on visualization and analysis"

Suppose that image library, information, biopolymer structures and analysis are all key phrases extracted at 520 (FIG. 5) and Jena Library and Biological Macromolecules are two proper nouns also extracted during 520. In FIG. 8, only image library is already in the associative array and the frequency is 4. Thus, the part of equation relating to this key phrase will yield a score of 1/(4+1)=0.2, while the other three key phrases and all proper nouns will give each a score of 1 since they haven't been met before. Thus, the algorithm searches the sentence that contains the most key phrases and proper nouns that have not been found by other selected sentences so far. KEYPHRASE_CONST and PROPER-NOUN_CONST are constants used to weight key phrases and proper nouns contribution in the equation.

The contextual score is combined to the basic score by the following equation:

$$FINAL\_SCORE = BASE\_SCORE \cdot BASERATIO + CONTEXT\_SCORE \cdot CONTEXTRATIO$$

Where BASERATIO and CONTEXTRATIO are two constants.

Figure 9:
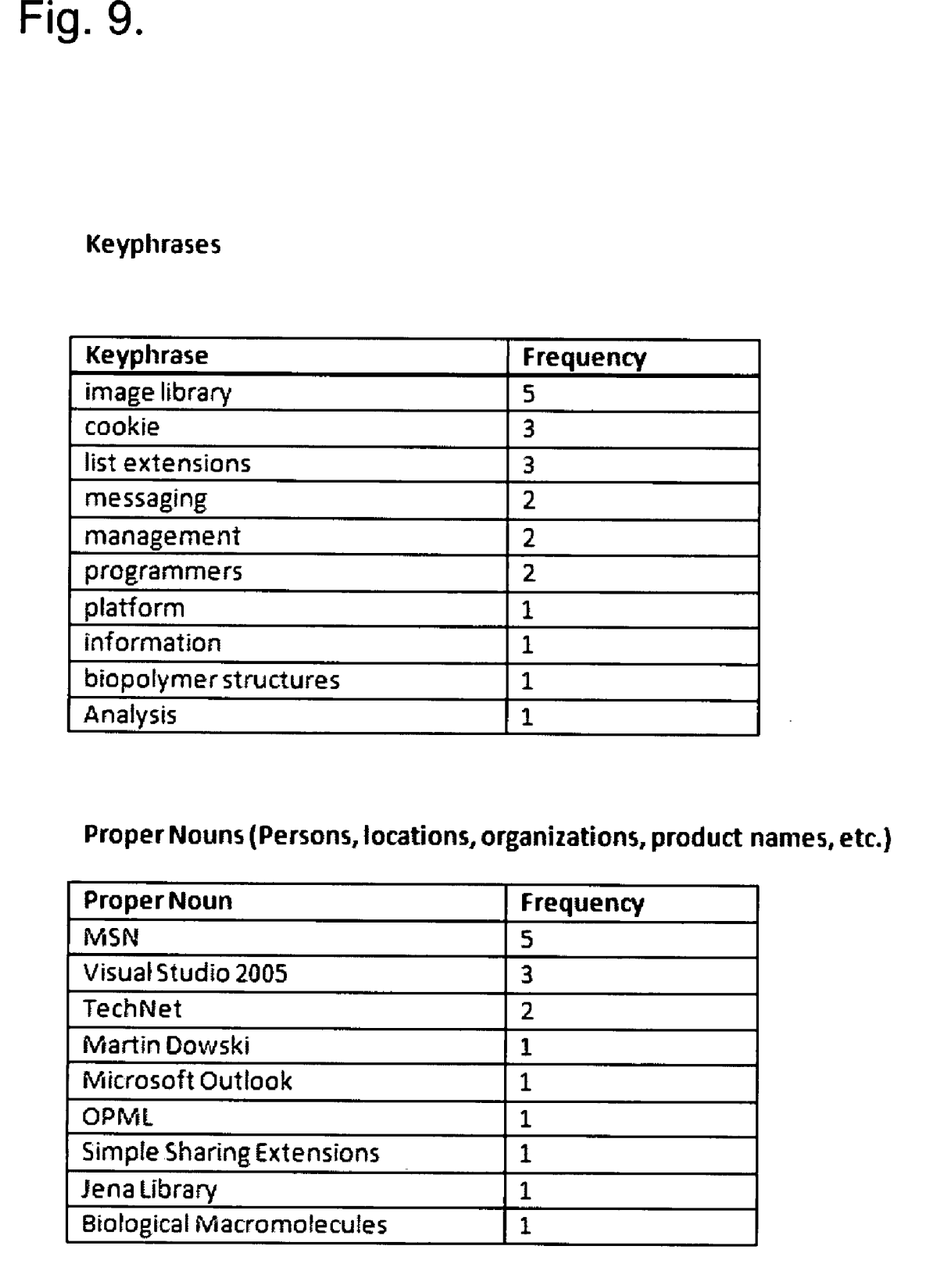
FIG. 9 contains tables to illustrate the results following the calculation of the contextual score for a sentence.

Finally, the associative arrays are updated to take into account the new key phrases and proper nouns found in the sentence. FIG. 9 illustrates the result of this update with the previous example.

Next, the system determines at 750 whether the score calculated at 740 is the highest so far. If true, the sentence is identified as the best sentence so far and its score is kept at 760, then the system goes to 770 to increment the value of Index, otherwise it goes directly to 770. Then, it loops at 730, and continue as long as there are sentences to evaluate in the candidate set. When there are no more candidates, the algorithm branches at 780, where the best sentence is added to the selected sentences set and the best sentence is removed from the candidate set. The algorithm then returns to 710 and the whole process is repeated until the selected sentence set contains THR sentences.

While illustrated in the block diagrams as groups of discrete components communicating with each other via distinct data signal connections, it will be understood by those skilled in the art that an embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present description is meant to encompass embodiments including a method, a system, a computer readable medium or an electrical or electromagnetical signal.

The embodiments described above are intended to be exemplary only. The scope of the description is therefore intended to be limited solely by the scope of the appended claims.

We claim:

1. A method for indexing audio/video documents through the use of a search engine, the method comprising:

providing, to the search engine, a source of training documents comprising textual content;

the search engine retrieving at least some of the training documents from the source of training documents;

the search engine extracting the textual content from the retrieved training documents;

the search engine indexing the textual content;

training a speech recognition profile using the indexed textual content;

providing, to the search engine, a source for the audio/video documents each of which comprise an associated audio content;

the search engine retrieving at least some of the audio/video documents from the source of documents;

the search engine extracting the associated content from the audio/video documents;

converting the associated audio content into transcriptions using the trained speech recognition profile;

the search engine indexing the transcriptions thereby resulting in an indexing of the audio/video documents; and saving the indexed transcriptions;

wherein the training of the speech recognition profile comprises using summary sentences and comparing the number of sentences to a threshold to determine if all sentences will be kept for the training.

2. The method of claim 1, wherein the providing a source of training documents comprises crawling and retrieving Web documents on a Web site.

3. The method of claim 1, wherein the providing a source of training documents comprises crawling and retrieving files on at least one of a local computer network, Intranet, Extranet, file repository or email messaging system.

4. The method of claim 1, wherein the providing a source of training documents comprises crawling and retrieving data from a database.

5. The method of claim 1, wherein the retrieving of the audio content comprises retrieving the audio content from the source of training documents.

6. The method of claim 1, wherein the retrieving of the audio content comprises retrieving the audio content from a source other than the source of training documents.

7. The method of claim 1, further comprising;

obtaining user input queries;

using the queries, finding sentences from the indexed textual content; and using the found sentences as input to perform the speech recognition profile training.

8. The method of claim 1, wherein the speech recognition profile comprises at least one of a dictionary and a language model.

9. The method of claim 1, further comprising a sentence selection process which comprises calculating a score for each sentence and keeping only those sentences which achieve a given score.

10. The method of claim 9, wherein the score is calculated using at least one of the number of words and the number of non-alphabetic characters in each of the sentences.

11. The method of claim 9, wherein the score is calculated by using the number of proper nouns in each of the sentences.

12. The method of claim 11, wherein the score is calculated by using the frequency of the proper nouns contained in each sentence in a pool of previously selected sentences.

13. The method of claim 11, wherein the score calculation results in a higher score when the sentence contains proper nouns that are infrequent in the pool of already selected sentences.

14. A method of searching for audio/video documents comprising:
- querying an index with a given search criterion, the database comprising transcriptions indexed according to the method of claim 1; and
- displaying the search results to a user.

15. A search engine system for indexing audio/video documents comprising:
- a search engine for:
- receiving a source of training documents comprising textual content;
- retrieving at least some of the training documents from the source of training documents;
- extracting the textual content from the retrieved training documents;
- indexing the textual content;
- receiving a source for the audio/video documents each of which comprise an associated audio content;
- retrieving at least some of the audio/video documents from the source of documents; and
- extracting the associated audio content from the audio/video documents;
- a training engine for training a speech recognition profile using the indexed textual content;
- a speech recognition engine converting the associated audio content into transcriptions using the trained speech recognition profile;
- the search engine further for indexing the transcriptions thereby resulting in an indexing of the audio/video documents; and
- an index for saving the indexed transcriptions;
- wherein the training of the speech recognition profile comprises using summary sentences and comparing the number of sentences to a threshold to determine if all sentences will be kept for the training.

16. The search engine system of claim 15 further comprising a user interface for receiving a query from a user, the query comprising a given search criterion and being used by the search engine for querying the index with the given search criterion, the search engine returning a search result for display by the user interface.

* * * * *